United States Patent

Okamoto et al.

(10) Patent No.: US 9,469,291 B2
(45) Date of Patent: Oct. 18, 2016

(54) VEHICLE CONTROL DEVICE

(71) Applicant: DENSO CORPORATION, Kariya, Aichi-pref. (JP)

(72) Inventors: Tsuyoshi Okamoto, Kariya (JP); Noriaki Ikemoto, Kariya (JP); Youhei Morimoto, Nagoya (JP); Yuutarou Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 23 days.

(21) Appl. No.: 14/511,461

(22) Filed: Oct. 10, 2014

(65) Prior Publication Data

US 2015/0105957 A1  Apr. 16, 2015

(30) Foreign Application Priority Data

Oct. 11, 2013 (JP) ................................. 2013-213552

(51) Int. Cl.
*B60W 20/00* (2016.01)
*B60W 10/06* (2006.01)
*B60W 10/30* (2006.01)
(Continued)

(52) U.S. Cl.
CPC .......... *B60W 10/06* (2013.01); *B60H 1/00899* (2013.01); *B60H 1/025* (2013.01); *B60W 10/30* (2013.01); *B60W 20/15* (2016.01); *B60Y 2306/07* (2013.01); *Y10S 903/93* (2013.01)

(58) Field of Classification Search
USPC ....... 701/22, 102; 60/303, 286; 123/142.5 R, 123/142.5 E, 41.02; 429/120; 180/65.28, 180/65.29, 65.265, 65.285, 65.275; 322/14; 903/903, 930
See application file for complete search history.

(56) References Cited

U.S. PATENT DOCUMENTS 5,789,882 A * 8/1998 Ibaraki et al. ............... 318/148
6,892,541 B2 * 5/2005 Suzuki ........................ 60/706
(Continued)

FOREIGN PATENT DOCUMENTS

DE  102010042290 A1 * 8/2011
JP  07215045 A * 8/1995 ............... B60H 1/12
(Continued)

OTHER PUBLICATIONS

Effect of advanced thermal management systems on hybrid electric drive units; Nessim, Waleed ; Zhang, Fujun ; Changlu, Zhao ; Zhenxia, Zhu; Strategic Technology (IFOST), 2012 7th International Forum on; DOI: 10.1109/IFOST.2012.6357678 Publication Year: 2012 , pp. 1-6.*

(Continued)

*Primary Examiner* — Cuong H Nguyen
(74) *Attorney, Agent, or Firm* — Nixon & Vanderhye PC

(57) ABSTRACT

A vehicle includes an engine, a first MG, a second MG, a main battery which can be charged and discharged, and a heating device. The heating device includes an exhaust heater which uses an exhaust heat of the engine, and a heat pump system which uses an electric power of the main battery. A hybrid control device determines a start timing of the heating device, based on a coolant temperature and a SOC. Specifically, the start timing of the heating device is determined such that a timing that the coolant temperature reaches a target temperature matches a timing that the SOC reaches a target value. After a warming-up operation is completed, an EV travelling of the vehicle can be executed according to the electric power of the main battery charged in the warming-up operation, and a fuel consumption of the engine is improved.

5 Claims, 9 Drawing Sheets

(51) Int. Cl.
    *B60H 1/00*      (2006.01)
    *B60H 1/02*      (2006.01)

(56) References Cited

U.S. PATENT DOCUMENTS

| | | | | |
|---|---|---|---|---|
| 7,047,728 | B2* | 5/2006 | Yasui | 60/285 |
| 7,478,691 | B2* | 1/2009 | Yamaguchi et al. | 180/65.28 |
| 8,209,970 | B2* | 7/2012 | Gonze et al. | 60/303 |
| 8,540,166 | B2* | 9/2013 | Nemoto | B60H 1/00764 123/41.11 |
| 8,607,552 | B2* | 12/2013 | Ikemoto et al. | 60/297 |
| 8,812,183 | B2* | 8/2014 | Tanaka | 701/22 |
| 9,260,103 | B2* | 2/2016 | Porras | B60H 1/00385 |
| 2006/0025897 | A1* | 2/2006 | Shostak | B60C 23/005 701/1 |
| 2010/0146943 | A1* | 6/2010 | Muramatsu et al. | 60/286 |
| 2011/0083426 | A1* | 4/2011 | Ikemoto et al. | 60/286 |
| 2013/0211649 | A1* | 8/2013 | Tashiro | B60H 1/00735 701/22 |
| 2013/0211650 | A1* | 8/2013 | Tashiro | B60W 10/06 701/22 |
| 2014/0058596 | A1* | 2/2014 | Martin et al. | 701/22 |
| 2014/0222264 | A9* | 8/2014 | Sujan et al. | 701/22 |
| 2015/0094894 | A1* | 4/2015 | Ito | B60L 1/02 701/22 |

FOREIGN PATENT DOCUMENTS

| | | | | |
|---|---|---|---|---|
| JP | | B2-3278919 | 2/2002 | |
| JP | | 3302483 B2 * | 7/2002 | B60H 1/12 |
| JP | | B2-4300600 | 5/2009 | |
| JP | | 2010-241190 | 10/2010 | |
| JP | | 2011080457 A * | 4/2011 | |
| JP | | 2011196289 A * | 10/2011 | |
| JP | | 2011196290 A * | 10/2011 | |
| JP | | 5229181 B2 * | 7/2013 | |

OTHER PUBLICATIONS

Engine emissions modeling for a hybrid electric vehicle; Gray, D.L.; Hentea, T.I.; Energy Conversion Engineering Conference, 2002. IECEC '02. 2002 37th Intersociety; DOI: 10.1109/IECEC.2002. 1392141; Publication Year: 2002, pp. 745-750.*

Real-time coolant temperature monitoring in power electronics using linear parameter-varying models for variable coolant flow situations; Warwel, M.; Wittler, G.; Hirsch, M.; Reuss, H.-C.; Thermal Investigations of ICs and Systs (Therminic), 2014 20th Inter Workshop on;DOI: 10.1109/THERMINIC.2014.6972513; Pub. Year: 2014 , pp. 1-4.*

Heat transfer analysis of a traction machine with directly cooled laminated windings; Reinap, Avo; Marquez-Fernandez, Francisco J.; Andersson, Rasmus; Hogmark, Conny; Alakula, Mats; Goransson, Anders; Electric Drives Production Conference (EDPC), 2014 4th Inter.; DOI: 10.1109/EDPC.2014.6984395; Pub. Year: 2014, pp. 1-7.*

Thermal management challenges in forced convection tablets; Bharath Nagendran; Arun Raghupathy; William Maltz Thermal Measurement, Modeling & Management Symposium (SEMI-THERM), 2015 31st; Year: 2015; pp. 37-40, DOI: 10.1109/SEMI-THERM.2015.7100136.*

Robust input-output linearization with input constraints for an engine cooling system; Saif Siddique Butt; Robert Prabel; Harald Aschemann; 2014 American Control Conference; Year: 2014; pp. 4555-4560, DOI: 10.1109/ACC.2014.6858647.*

Input-output linearisation with input constraints for an innovative engine cooling system; Saif Siddique Butt; Robert Prabel; Harald Aschemann; Control Conference (ECC), 2014 European; Year: 2014; pp. 2679-2684, DOI: 10.1109/ECC.2014.6862392.*

Multi-variable flatness-based control for an engine cooling system; Saif Siddique Butt; Robert Prabel; Robert Grimmecke; Harald Aschemann; 2014 IEEE Conference on Control Applications (CCA); Year: 2014; pp. 1551-1556, DOI: 10.1109/CCA.2014. 6981545.*

* cited by examiner

VEHICLE CONTROL DEVICE

CROSS REFERENCE TO RELATED APPLICATION

This application is based on Japanese Patent Application No. 2013-213552 filed on Oct. 11, 2013, the disclosure of which is incorporated herein by reference.

TECHNICAL FIELD

The present disclosure relates to a vehicle control device.

BACKGROUND

Conventionally, a heater core using an exhaust heat of an engine is well-known. According to Japanese Patent No. 3278919, when a heating is started in a case where a temperature of a coolant of the engine is low, a cold air flows to passengers. Therefore, when the temperature of the coolant is less than a predetermined temperature, the heating is not started.

However, in a vehicle provided with an exhaust heater and an electric heater which are used as heating devices, the optimum start timing of the heating cannot be determined only by the temperature of the coolant.

SUMMARY

The present disclosure is made in view of the above matters, and it is an object of the present disclosure to provide a vehicle control device which can properly determine a heating start timing in a hybrid vehicle provided with an exhaust heater and an electric heater which are used as a heating device.

According to the present disclosure, the vehicle control device controls the hybrid vehicle. The hybrid vehicle includes an engine, a motor generator, a power storage device, and a heating device. The power storage device receives an electric power from or transmits the electric power to the motor generator, and can be charged and discharged. The heating device includes an exhaust heater which uses an exhaust heat of the engine, and an electric heater which uses an electric power of the power storage device.

The vehicle control device includes a coolant-temperature acquiring portion, a power-residual acquiring portion, and a heating start-timing determining portion. The coolant-temperature acquiring portion acquires a temperature of a coolant of the engine. The power-residual acquiring portion acquires a power residual of the power storage device. The heating start-timing determining portion determines a start timing of the heating device based on the temperature of the coolant and the power residual.

According to the present disclosure, the start timing of the heating device is determined based on the temperature of the coolant and the power residual. Specifically, the start timing of the heating device is determined such that a timing that the temperature of the coolant reaches a target temperature matches a timing that the power residual reaches a target value. When the power residual is sufficiently large after a warming-up operation is completed, an EV travelling of the vehicle can be executed according to the electric power of the power storage device charged in the warming-up operation, and a fuel consumption of the engine is improved.

In a case where the power residual of when the warming-up is started is large, the heating is started by the electric heater before the warming-up is completed, and the electric power of the power storage device is used and charged. Therefore, the engine can operate at an efficient operation point without considering the power residual, and the fuel consumption of the engine is improved.

Since the heating device starts in the warming-up operation, comparing with a case where the heating device starts after the warming-up operation is completed, an inner temperature of the vehicle rapidly reaches a target inner temperature, and a comfortability is improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
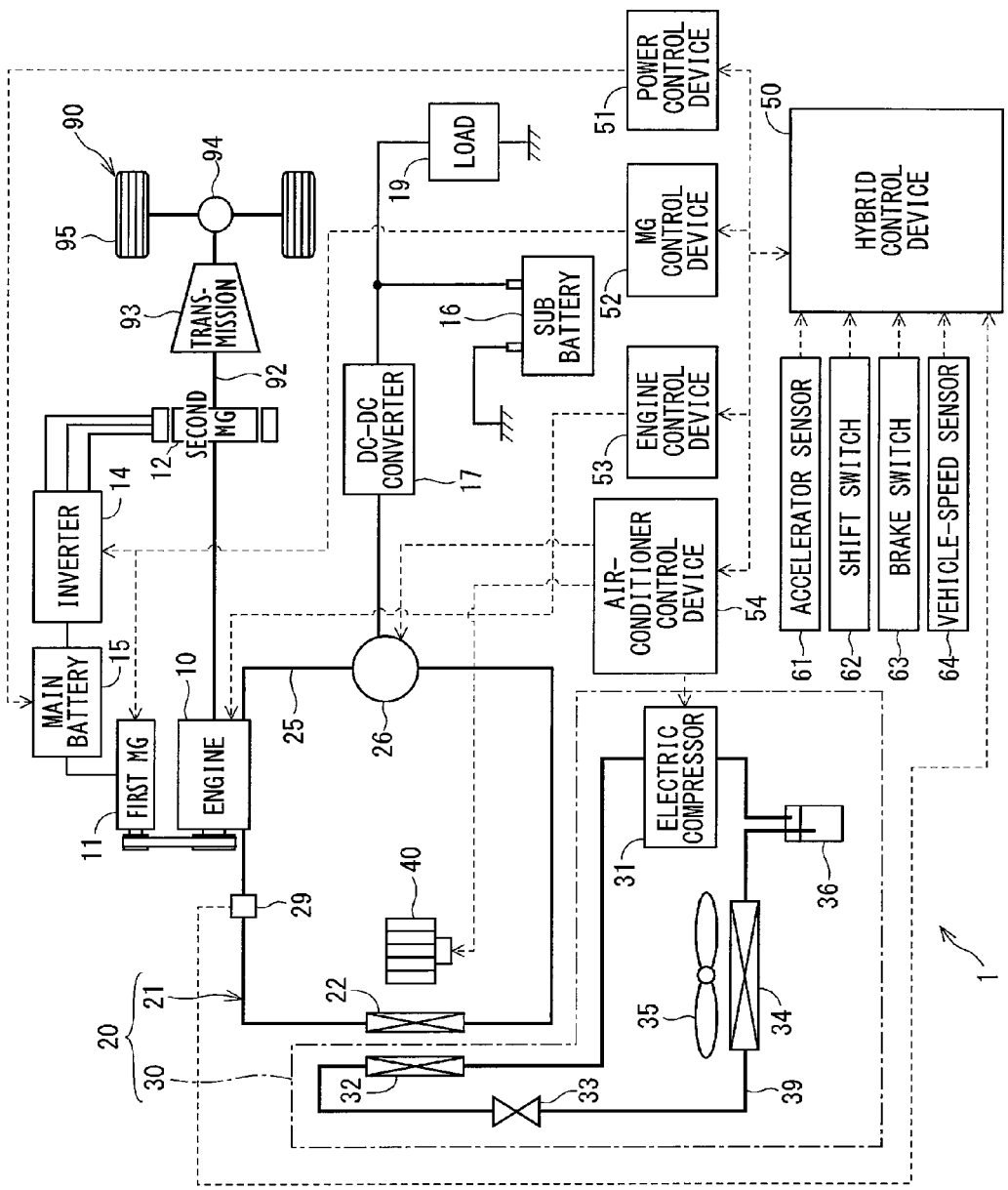
FIG. 1 is a block diagram showing a vehicle control system according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, a vehicle control device according to the present disclosure will be described. The substantially same parts and the components as the follow-

First Embodiment

FIG. 1 is a block diagram showing a vehicle control system 1 to which a vehicle control device is applied, according to a first embodiment of the present disclosure. The vehicle control system 1 includes an engine 10, a first motor generator 11, a second motor generator 12, a main battery 15 as a power storage device, a heating device 20, and a hybrid control device 50 as the vehicle control device. Hereafter, the motor generator is referred to as MG.

The engine 10 is an internal combustion engine provided with multiple cylinders. The engine 10, the first MG 11, and the second MG 12 correspond to a driving power source of a vehicle 90. According to the present embodiment, the vehicle 90 is a hybrid vehicle travelling according to a driving force of the engine 10, the first MG 11, or the second MG 12.

The first MG 11 and the second MG 12 have an electric motor function that the first MG 11 and the second MG 12 are rotated by an electric power supplied from the main battery 15 to generate a torque, and a power generator function that the first MG 11 and the second MG 12 are driven by the engine 10 or by the vehicle 90 that is braked to generate the electric power. According to the present embodiment, both the first MG 11 and the second MG 12 are three-phase AC motors corresponding to permanent-magnet synchronous motors.

The first MG 11 is driven by the engine 10, and is mainly used to generate the electric power. The electric power generated by the first MG 11 is supplied to the main battery 15 via an inverter that is not shown.

The second MG 12 is mainly used as an electric motor. The second MG 12 is power supplied from the main battery 15 via an inverter 14. When the vehicle 90 is accelerated, the second MG 12 is used as the electric motor. When the vehicle 90 is decelerated, the second MG 12 is used as the power generator. In this case, the electric power generated by the second MG 12 is supplied to the main battery 15 via the inverter 14.

The driving force of the engine 10 and the driving force of the second MG 12 are transmitted to a transmission 93 via a driving shaft 92, and are further transmitted to a driving wheel 95 via a differential gear 94 to rotate the driving wheel 95. According to the present embodiment, the transmission 93 is a continuously variable transmission.

The main battery 15 includes a rechargeable battery made of nickel hydride or lithium ion. The main battery 15 can be charged or discharged. A state of charge (SOC) of the main battery 15 corresponding to a power residual is controlled to be in a predetermined range. The main battery 15 receives the electric power from or transmits the electric power to the first MG 11 and the second MG 12. Specifically, an AC power generated by the first MG 11 or the second MG 12 is converted into a DC power, and is stored in the main battery 15. Then, the DC power of the main battery 15 is converted into the AC power, and is mainly supplied to the second MG 12.

A sub battery 16 is battery outputting an output voltage that is less than an output voltage of the main battery 15. The sub battery 16 is connected to the main battery 15 via a DC-DC converter 17. Therefore, the sub battery 16 is chargeable according to an electric power stepped down by the DC-DC converter 17 from the electric power of the main battery 15. The electric power of the sub battery 16 is supplied to devices which are driven by a low voltage, such as a load 19 or an electric pump 26.

The heating device 20 includes an exhaust heater 21, a heat pump system 30 as an electric heater, and a blower fan 40 as a blower.

The exhaust heater 21 includes a heater core 22, a circulation passage 25, and the electric pump 26. The heater core 22 heat exchanges from a coolant of the engine 10 and supplies an exchanged heat to an interior of the vehicle 90. The blower fan 40 sends air toward the interior of the vehicle 90.

A water jacket is provided in a cylinder block of the engine 10 or a cylinder head of the engine 10. The coolant is circulated through the water jacket to cool down the engine 10. The water jacket communicates with the circulation passage 25 including a coolant pipe. The circulation passage 25 is provided with the electric pump 26. The electric pump 26 is power supplied and driven by the sub battery 16 to circulate the coolant. A flow rate of the coolant circulating through the circulation passage 25 is adjusted by changing a discharge quantity of the electric pump 26.

The circulation passage 25 extends from an outlet of the engine 10 toward the heater core 22, and returns back to the engine 10 via the heater core 22. The air sent from the blower fan 40 flows through the heater core 22, and is heated by a heat exchange with the coolant to become a warm air. The warm air is supplied from an outlet of the blower fan 40 to the interior of the vehicle 90. According to the above configuration, a heat quantity supplied from the coolant to the interior of the vehicle 90 via the heater core 22 is controlled by controlling the discharge quantity of the electric pump 26 and a driving state of the blower fan 40.

A temperature sensor 29 is disposed at a position of the circulation passage 25 adjacent to the outlet of the engine 10. The temperature sensor 29 detects a temperature of the coolant at a position between the outlet of the engine 10 and the heater core 22. The temperature of the coolant is referred to as a coolant temperature.

The heat pump system 30 uses the electric power to supply the heat to the interior of the vehicle 90. The heat pump system 30 includes an electric compressor 31, an interior heat exchanger 32, an expansion valve 33, an exterior heat exchanger 34, an accumulator 36, and a refrigerant circulation passage 39 that includes a refrigerant pipe communicating with the above members.

The electric compressor 31 compresses and heats a refrigerant, and discharges a heated refrigerant toward the interior heat exchanger 32. The electric compressor 31 is driven by the electric power supplied from the main battery 15 via the inverter that is not shown.

The interior heat exchanger 32 executes a heat exchange between the heated refrigerant discharged by the electric compressor 31 and a blowing air sent from the blower fan 40 toward the interior of the vehicle 90. The blowing air flows through the interior heat exchanger 32 and is heated by a heat exchange with the heated refrigerant to become a warm air. The warm air is supplied from the outlet of the blower fan 40 to the interior of the vehicle 90. In this case, the refrigerant is cooled down by the heat exchange with the blowing air. The refrigerant flowed through the interior heat exchanger 32 is decompressed by the expansion valve 33 and is discharged to the exterior heat exchanger 34.

The exterior heat exchanger 34 is disposed at a position outside of the interior of the vehicle 90. The exterior heat exchanger 34 executes a heat exchange between the refrigerant and an outer air. The outer air is sent to the exterior heat exchanger 34 by a radiator fan 35. The refrigerant decompressed by the expansion valve 33 is heated by a heat exchange with the outer air at the exterior heat exchanger 34. The refrigerant heated by the exterior heat exchanger 34 is discharged to the electric compressor 31 via the accumulator 36.

According to the present embodiment, the vehicle control system 1 further includes the hybrid control device 50, a power control device 51, an MG control device 52, an engine control device 53, and an air-conditioner control device 54. The hybrid control device 50, the power control device 51, the MG control device 52, the engine control device 53, and the air-conditioner control device 54 are constructed by microcomputers each of which includes a CPU, a ROM, and a RAM, and execute programs stored in the ROMs to execute various controls.

The hybrid control device 50 receives signals from an accelerator sensor 61, a shift switch 62, a brake switch 63, a vehicle-speed sensor 64, and the temperature sensor 29, and controls the vehicle 90 based on the signals.

The power control device 51 obtains the SOC of the main battery 15, and monitors whether the SOC is in the predetermined range.

The MG control device 52 controls a driving of the first MG 11 or a driving of the second MG 12 based on a command of the hybrid control device 50.

The engine control device 53 controls an operation of the engine 10 based on a command of the hybrid control device 50. Specifically, the engine control device 53 executes an injection control of a fuel injector, an ignition timing control of an ignition device, a valve timing control of an intake valve-driving mechanism and an exhaust valve-driving mechanism, and an intake-quantity control of a throttle valve. Therefore, the operation of the engine 10 is controlled.

The air-conditioner control device 54 controls the blower fan 40, the electric pump 26, and the electric compressor 31, based on a command of the hybrid control device 50.

When the hybrid vehicle operates in a warming-up operation, it is necessary to increase an engine efficiency and to increase an engine output. Therefore, since the hybrid vehicle charges power and heats the coolant at the same time, a fuel consumption of the engine 10 can be improved. However, when the SOC reaches an upper limit, an output of the engine 10 cannot be increased. In this case, the engine 10 cannot be driven at a high efficiency.

According to the present embodiment, the heating device 20 is properly controlled based on the SOC of the main battery 15 in addition of the coolant temperature. Therefore, the engine 10 is driven at a high efficiency, and a warming-up can be completed at an early stage.

Figure 2:
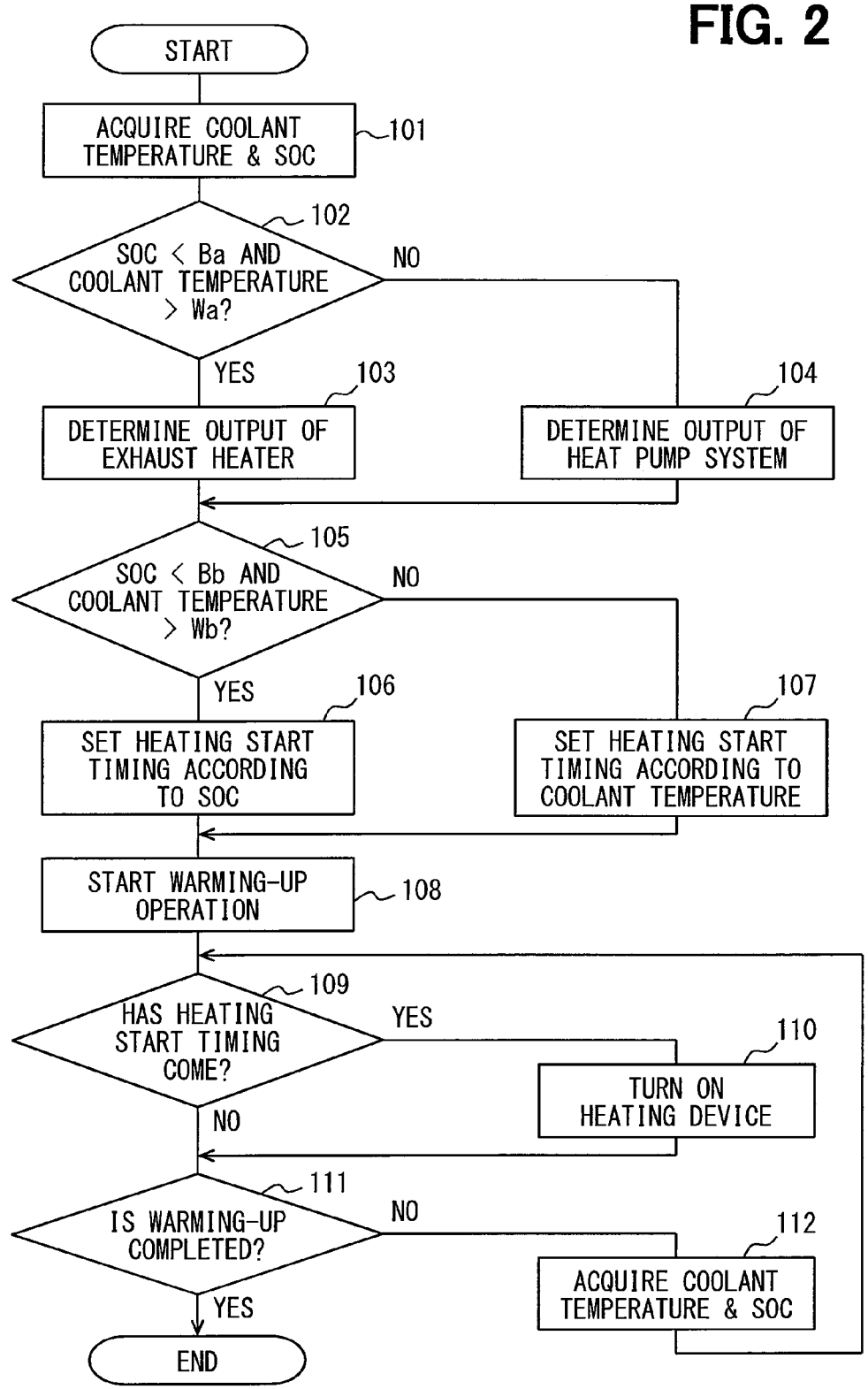
FIG. 2 is a flowchart showing a warming-up control according to the first embodiment.

Referring to a flowchart shown in FIG. 2, a warming-up control according to the present embodiment will be described. The warming-up control is executed by the hybrid control device 50 in a case where an ignition power is turned on.

At 101, the hybrid control device 50 acquires the coolant temperature from the temperature sensor 29. Further, the hybrid control device 50 acquires the SOC of the main battery 15.

At 102, the hybrid control device 50 determines whether both a first condition that the SOC is less than a first predetermined residual quantity Ba and a second condition that the coolant temperature is greater than a first predetermined temperature Wa are met. When the hybrid control device 50 determines that the first condition or the second condition is not met (102: No), the hybrid control device 50 proceeds to 104. When the hybrid control device 50 determines that both the first condition and the second condition are met (102: Yes), the hybrid control device 50 proceeds to 103.

Figure 3:
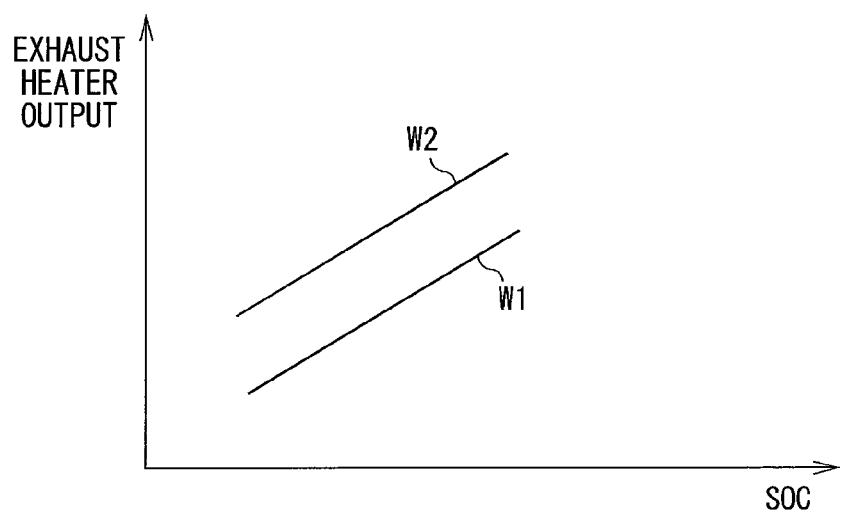
FIG. 3 is a graph showing a map determining an exhaust heater output according to the first embodiment.

At 103, the hybrid control device 50 selects the exhaust heater 21 as the heating device 20, and determines an output of the exhaust heater 21. The output of the exhaust heater 21 is referred to as an exhaust heater output. The exhaust heater output is determined according to the SOC and the coolant temperature. According to the present embodiment, as shown in FIG. 3, a map indicating a relationship between the exhaust heater output, the SOC, and the coolant temperature is established. The exhaust heater output is determined based on the SOC and the coolant temperature in reference to the map. As shown in FIG. 3, a relationship between the SOC and the exhaust heater output is indicated in a case where the coolant temperature is W1 or W2. In this case, the coolant temperature W1 is less than the coolant temperature W2.

Figure 4:
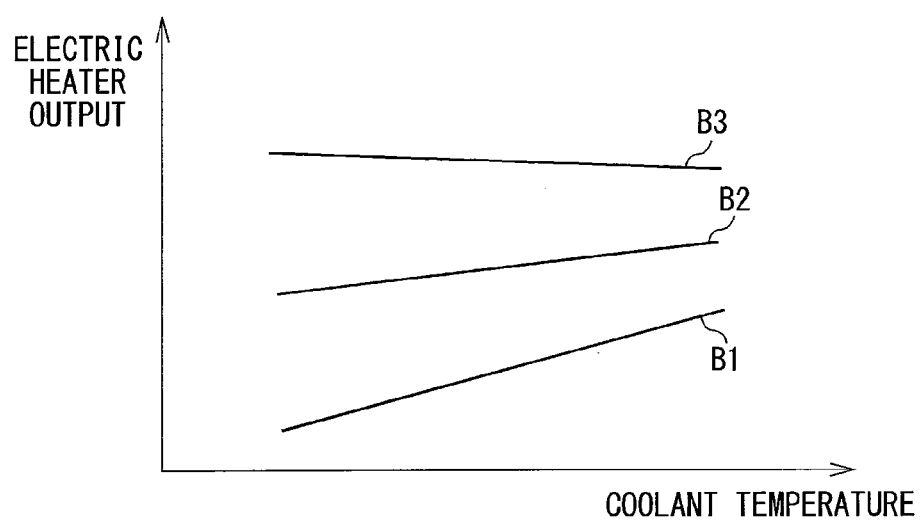
FIG. 4 is a graph showing a map determining an electric heater output according to the first embodiment.

At 104, the hybrid control device 50 selects the heat pump system 30 as the heating device 20, and determines an output of the heat pump system 30. The output of the heat pump system 30 is referred to as an electric heater output. The electric heater output is determined according to the SOC and the coolant temperature. According to the present embodiment, as shown in FIG. 4, a map indicating a relationship between the electric heater output, the SOC, and the coolant temperature is established. The electric heater output is determined based on the SOC and the coolant temperature in reference to the map. As shown in FIG. 4, a relationship between the coolant temperature and the electric heater output is indicated in a case where the SOC is B1, B2, or B3. In this case, B1 is less than B2, and B2 is less than B3.

The exhaust heater output and the electric heater output are set such that the SOC reaches a SOC target value Bg at a time point that the coolant temperature reaches a warming-up complete temperature Wg. At the time point that the coolant temperature reaches the warming-up complete temperature Wg, the warming-up is completed. According to the present embodiment, the warming-up complete temperature Wg corresponds to a temperature target value, and the SOC target value Bg corresponds to a power residual target value.

At 105, the hybrid control device 50 determines whether both a third condition that the SOC is less than a second predetermined residual quantity Bb and a fourth condition that the coolant temperature is greater than a second predetermined temperature Wb are met. When the hybrid control device 50 determines that the third condition or the fourth condition is not met (105: No), the hybrid control device 50 proceeds to 107. When the hybrid control device 50 determines that both the third condition and the fourth condition are met (105: Yes), the hybrid control device 50 proceeds to 106.

Figure 5:
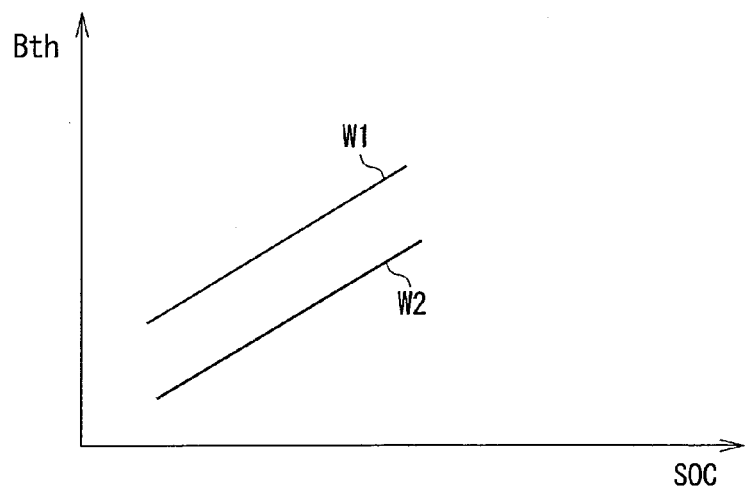
FIG. 5 is a graph showing a map determining a heating start SOC according to the first embodiment.

At 106, the hybrid control device 50 sets a heating start timing according to the SOC. Specifically, as shown in FIG. 5, a map indicating a relationship between a heating start SOC threshold Bth corresponding to the SOC of when a heating is started, the SOC, and the coolant temperature is established. The heating start SOC threshold Bth is determined based on the SOC and the coolant temperature in reference to the map. As shown in FIG. 5, a relationship between the SOC and warming-up start SOC threshold Bth is indicated in a case where the coolant temperature is W1 or W2. In this case, the coolant temperature W1 is less than the coolant temperature W2.

Figure 6:
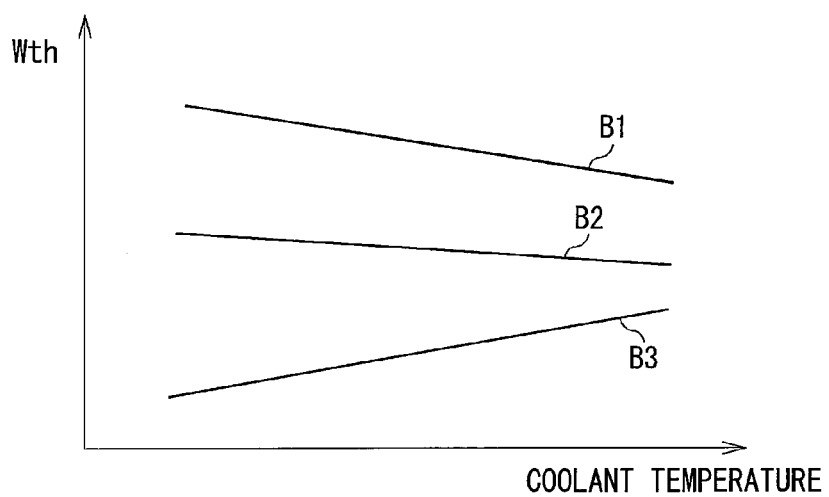
FIG. 6 is a graph showing a map determining a heating start temperature according to the first embodiment.

At 107, the hybrid control device 50 sets the heating start timing according to the coolant temperature. Specifically, as shown in FIG. 6, a map indicating a relationship between a heating start temperature threshold Wth corresponding to the coolant temperature of when the heating is started, the SOC, and the coolant temperature is established. The heating start temperature threshold Wth is determined based on the SOC and the coolant temperature in reference to the map. As shown in FIG. 6, a relationship between the coolant temperature and the warming-up start temperature threshold Wth is indicated in a case where the SOC is B1, B2, or B3. In this case, B1 is less than B2, and B2 is less than B3.

The heating start SOC threshold Bth and the heating start temperature threshold Wth are set such that the SOC reaches the SOC target value Bg at the time point that the coolant temperature reaches the warming-up complete temperature Wg. At the time point that the coolant temperature reaches the warming-up complete temperature Wg, the warming-up is completed.

According to the present embodiment, when the SOC is greater than or equal to the heating start SOC threshold Bth, the heating is started. Therefore, when the heating start SOC threshold Bth is determined, a heating-device start-timing is determined. The heating-device start-timing corresponds to a start timing of the heating device 20. When the coolant temperature is greater than or equal to the heating start temperature threshold Wth, the heating is started. Therefore, when the heating start temperature threshold Wth is determined, the heating-device start-timing is determined.

At 108, the hybrid control device 50 starts the warming-up operation of the engine 10.

At 109, the hybrid control device 50 determines whether the heating start timing has come. When the hybrid control device 50 determines that the heating start timing has not come (109: No), the hybrid control device 50 proceeds to 111. When the hybrid control device 50 determines that the heating start timing has come (109: Yes), the hybrid control device 50 proceeds to 110. Specifically, in a case where both the third condition and the fourth condition are met at 105, (i) when the SOC is less than the heating start SOC threshold Bth, it is determined that the heating start timing has not come; (ii) when the SOC is greater than or equal to the heating start SOC threshold Bth, it is determined that the heating start timing has come. Alternatively, in a case where the third condition or the fourth condition is not met at 105, (i) when the coolant temperature is less than the heating start temperature threshold Wth, it is determined that the heating start timing has not come; (ii) when the coolant temperature is greater than or equal to the heating start temperature threshold Wth, it is determined that the heating start timing has come.

At 110, the hybrid control device 50 turns on the heating device 20. Specifically, when the exhaust heater 21 is used as the heating device 20, the hybrid control device 50 controls a flow rate of the electric pump 26 such that the exhaust heater output becomes the output of the exhaust heater 21 determined at 103. Alternatively, when the heat pump system 30 is used as the heating device 20, the hybrid control device 50 turns on the heat pump system 30 and controls the electric heater output to be the output of the heat pump system 30 determined at 104. Further, the hybrid control device 50 turns on the blower fan 40.

When the heating is started in a case where the coolant temperature is low, or when the heat pump system 30 is used in a case where the output of the engine 10 is low, it is necessary to reduce an output of the blower fan 40 so as to prevent cold air flowing toward passengers. The cold air is generated because a temperature of the outlet of the blower fan 40 is low.

At 111, the hybrid control device 50 determines whether the warming-up is completed. When the coolant temperature is greater than or equal to the warming-up complete temperature Wg, the warming-up is completed. When the hybrid control device 50 determines that the warming-up is not completed, (111: No), the hybrid control device 50 proceeds to 112. At 112, the hybrid control device 50 reacquires the coolant temperature and the SOC, and returns to 109. When the hybrid control device 50 determines that the warming-up is completed, (111: Yes), the hybrid control device 50 terminates the warming-up operation. According to the present embodiment, when the warming-up is completed, since the heating device 20, the output of the heating device 20, and the heating start timing are set such that the SOC reaches the SOC target value Bg, the main battery 15 is sufficiently charged. Therefore, after the warming-up is completed, the driving force of the second MG 12 is transmitted to the vehicle 90 such that the vehicle 90 travels in an EV travelling mode. Further, the vehicle 90 can travel in other modes other than the EV travelling mode, according to other information such as an accelerator position.

According to the present embodiment, even though the engine 10 operates in the warming-up operation, when the heating start timing has come, the exhaust heater 21 or the heat pump system 30 is started.

For example, when the SOC is small, the engine 10 is driven to increase an output in a high engine-efficiency area, and the main battery 15 is charged.

When the SOC is large, the heat pump system 30 is started even though the engine 10 operates in the warming-up operation, and an electric power of the main battery 15 can be used. The engine 10 is driven in the high engine-efficiency area, and the electric power of the main battery 15 is used while the main battery 15 is charged.

In a case where the coolant temperature is high and the SOC is small, when the main battery 15 is charged such that the SOC becomes the target value, the coolant temperature becomes excessively high, and it is possible to radiate heat from a radiator that is not shown to outer air. In this case, when the coolant temperature is less than the warming-up complete temperature Wg, the heating is started according to the exhaust heater 21. Therefore, heat of the coolant can be transmitted to the interior of the vehicle 90, and it is prevented that the heat is radiated to the outer air.

The engine 10 is driven in the high engine-efficiency area by changing the heating-device start-timing according to the coolant temperature and the SOC. Therefore, the main battery 15 is efficiently charged, the coolant temperature is efficiently increased, and the warming-up can be completed at an early stage. Thus, the fuel consumption of the engine 10 can be improved.

Further, the main battery 15 is charged in the warming-up operation. An EV travelling of the vehicle 90 can be executed according to the electric power of the main battery 15 after the warming-up is completed. Thus, the fuel consumption of the engine 10 can be further improved.

Furthermore, since the heating is started before the warming-up is completed, an inner temperature of the vehicle 90 rapidly reaches a target inner temperature, and a comfortability is improved.

The vehicle 90 includes the engine 10, the first MG 11, the second MG 12, the main battery 15, and the heating device 20. The main battery 15 receives the electric power from or transmits the electric power to the first MG 11 and the second MG 12, and can be charged and discharged. The heating device 20 includes the exhaust heater 21 which uses an exhaust heat of the engine 10, and the heat pump system 30 which uses the electric power of the main battery 15.

The hybrid control device 50 controlling the vehicle 90 acquires the coolant temperature of the engine 10 and the SOC of the main battery 15 (101, 112), and determines the heating-device start-timing based on the coolant temperature and the SOC (106, 107).

According to the present embodiment, the heating-device start-timing is determined based on the coolant temperature and the SOC. The heating-device start-timing is determined such that a coolant timing that the coolant temperature reaches the warming-up complete temperature Wg matches a SOC timing that the SOC reaches the SOC target value Bg. When the SOC is sufficiently large after the warming-up operation is completed, the EV travelling of the vehicle 90 can be executed according to the electric power of the main battery 15 charged in the warming-up operation, and the fuel consumption of the engine 10 is improved.

In addition, when the coolant timing matches the SOC timing, it is unnecessary that the coolant timing is completely equal to the SOC timing. In this case, a time lag between the coolant timing and the SOC timing can be in a predetermined time. Since it is better that the SOC is increased such that the EV travelling of the vehicle 90 can be executed after the warming-up operation is completed, a state that the SOC reaches a predetermined value corresponds to a state that the coolant timing matches the SOC timing.

In a case where the SOC of when the warming-up is started is large, the heating is started by the heat pump system 30 before the warming-up is completed, and the electric power of the main battery 15 is used and charged. Therefore, the engine 10 can operate at an efficient operation point without considering the SOC, and the fuel consumption of the engine 10 is improved.

Since the heating device 20 starts in the warming-up operation, comparing with a case where the heating device 20 starts after the warming-up operation is completed, the inner temperature of the vehicle 90 rapidly reaches the target inner temperature, and the comfortability is improved.

The hybrid control device 50 determines a heating output corresponding to the exhaust heater output and the electric heater output in the warming-up operation, based on the coolant temperature and the SOC (103, 104). According to the present embodiment, the heating output is determined such that the coolant timing matches the SOC timing.

Therefore, the heating device 20 is properly controlled such that the coolant timing matches the SOC timing. Since the SOC reaches the SOC target value in a case where the warming-up is completed, the EV travelling of the vehicle 90 can be executed after the warming-up operation, and the fuel consumption of the engine 10 is improved.

The hybrid control device 50 determines the output of the blower fan 40 sending air toward the interior of the vehicle 90, based on at least one of the coolant temperature and the electric heater output (110). For example, when the heating is started in a case where the coolant temperature is low or the electric heater output is small, the output of the blower fan 40 is reduced to prevent cold air flowing toward the interior of the vehicle 90.

According to the present embodiment, the hybrid control device 50 corresponds to a coolant-temperature acquiring portion, a power-residual acquiring portion, a heating start-timing determining portion, a heating-output determining portion, and a blowing-output determining portion. Further, as shown in FIG. 2, operations in 101 and 112 correspond to the coolant-temperature acquiring portion and the power-residual acquiring portion. Operations in 106 and 107 correspond to the heating start-timing determining portion. Operations in 103 and 104 correspond to the heating-output determining portion. An operation in 110 corresponds to the blowing-output determining portion.

Second Embodiment

According to a second embodiment of the present disclosure, the warming-up control is different from that of the first embodiment.

Referring to a flowchart shown in FIG. 7, the warming-up control according to the present embodiment will be described.

Figure 8:
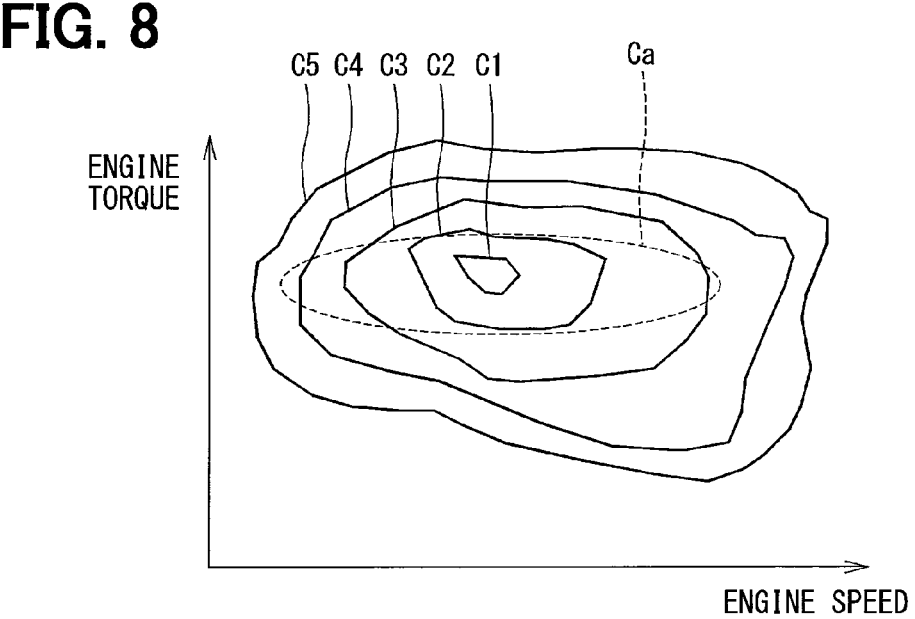
FIG. 8 is a graph showing an engine efficiency according to the second embodiment.

At 201, the hybrid control device 50 loads a high engine-efficiency area map. As shown in FIG. 8, the high engine-efficiency area map includes lines C1 to C5 each of which has operation points of the engine 10 where the engine efficiencies are the same. In this case, the operation points of the engine 10 may be engine speeds or engine torques. As shown in FIG. 8, the line C1 has the highest engine efficiency of the lines C1 to C5, and the line C5 has the lowest engine efficiency of the lines C1 to C5. Further, the engine efficiencies of lines C1 to C5 have relationships that C1 is greater than C2 and C2 is greater than C3 and C3 is greater than C4 and C4 is greater than C5. According to the present embodiment, an interior of the line C3 is defined as the high engine-efficiency area.

Alternatively, an interior of a line Ca may be defined as the high engine-efficiency area. The line Ca has operation points of the entire system that considers the first MG 11, the second MG 12, and the main battery 15 instead of the engine 10.

Alternatively, two or more high engine-efficiency maps may be defined according to travelling loads or vehicle speeds.

At 202, the hybrid control device 50 acquires the coolant temperature from the temperature sensor 29, and acquires the SOC of the main battery 15 via the power control device 51.

At 203, the hybrid control device 50 acquires the target inner temperature and a target period that the inner temperature reaches the target inner temperature, from the air-conditioner control device 54, and computes an air-conditioner request output Pa. The unit of the air-conditioner request output Pa is kW. The air-conditioner request output Pa is computed according to an equation (1).

$$Pa = Ka \times (Rg - Rn)/tg \qquad (1)$$

Ka indicates a specific-heat coefficient of air, and the unit of which is kJ/K.

Rg indicates the target inner temperature, and the unit of which is degree Celsius.

Rn indicates a current inner temperature, and the unit of which is degree Celsius.

tg indicates the target period, and the unit of which is sec.

At 204, the hybrid control device 50 computes a SOC measuring period ts that the SOC reaches the SOC target value Bg, a temperature measuring period tw that the coolant temperature reaches the warming-up completer temperature Wg, and a difference between the SOC measuring period ts and the temperature measuring period tw as a measuring-period difference Δt.

The SOC measuring period ts is computer according to an equation (2). The unit of the SOC measuring period ts is sec.

$$ts = Ks \times (Bg - Bn)/Pg \qquad (2)$$

Ks indicates a converting coefficient of the SOC to be converted into the electric power, and the unit of which is kJ/%.

Bg indicates the SOC target value, and the unit of which is %.

Bn indicates a SOC current value, and the unit of which is %.

Pg indicates a generation power, and the unit of which is kW.

The generation power Pg is computed according to an equation (3).

$$Pg=Pe-Lr-La \qquad (3)$$

Pe indicates the engine output, and the unit of which is kW.

Lr indicates a travelling load, and the unit of which is kW.

La indicates an accessory load corresponding to a load of other accessories, and the unit of which is kW.

Figure 9:
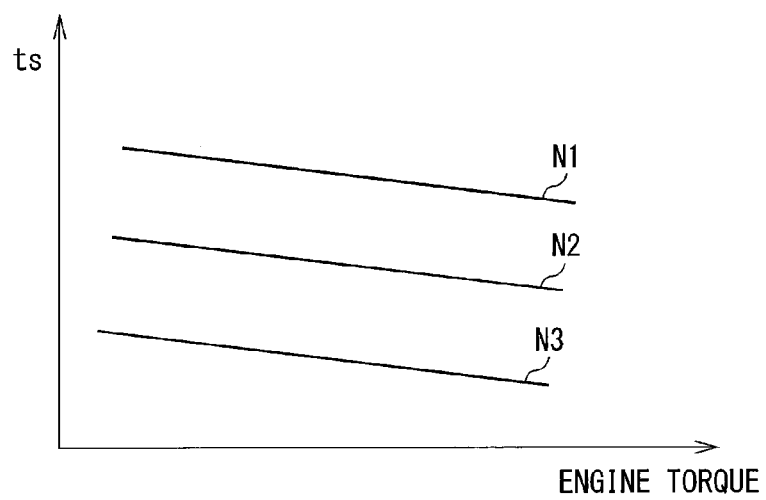
FIG. 9 is a graph showing a map determining a SOC measuring period according to the second embodiment.

The SOC measuring period ts is previously computed according to the equation (2). Further, a map indicating a relationship between the SOC measuring period ts, the engine torque, the engine speed is established. FIG. 9 is a graph showing a relationship between the engine torque, the engine speed, and the SOC measuring period ts in a case where the travelling load Lr and the accessory load La are zero. Further, the engine speeds N1, N2, and N3 have relationships that N1 is less than N2 and N2 is less than N3. According to equations (2) and (3), since the SOC measuring period ts varies according to the travelling load Lr and the accessory load La, two or more maps are established at different travelling loads Lr and different accessory loads La. The SOC measuring period ts corresponds to a power-residual measuring period.

At 204, the hybrid control device 50 selects the map based on the travelling load Lr and the accessory load La, and computes the SOC measuring period ts based on the engine operation point including the engine torque and the engine speed at a previous operation, and the map. The engine operation point may be an average point of a predetermined number of times of the engine operation points. Alternatively, the SOC measuring period ts may be directly computed according to equations (2) and (3).

The temperature measuring period tw is computed according to an equation (4). The unit of the temperature measuring period tw is sec.

$$tw=Kw \times (Wg-Wn)/Ph \qquad (4)$$

Kw indicates a converting coefficient of the coolant temperature to be converted into the electric power, and the unit of which is kJ/K.

Wg indicates the warming-up complete temperature, and the unit of which is degree Celsius.

Wn indicates a current coolant temperature, and the unit of which is degree Celsius.

Ph indicates a heating power, and the unit of which is kW.

Figure 10:
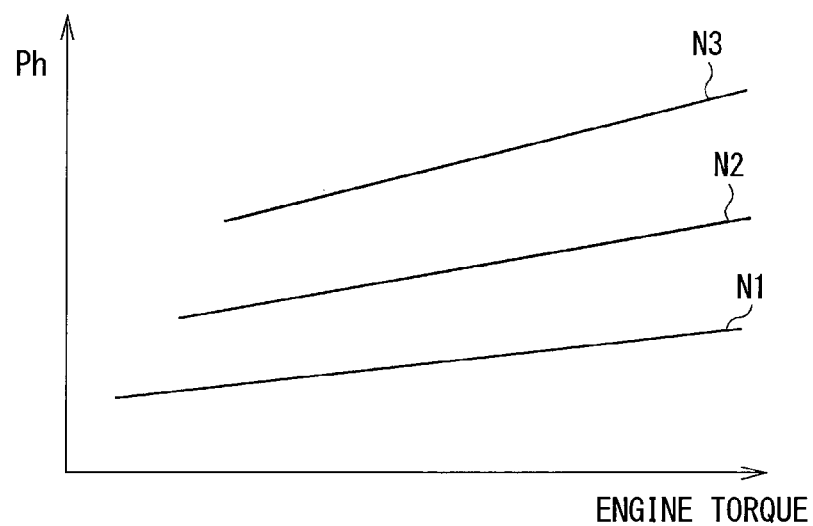
FIG. 10 is a graph showing a heating power according to the second embodiment.

As shown in FIG. 10, a heating-power map indicating a relationship between the heating power Ph, the engine torque, and the engine speed in the high engine-efficiency area is established. The heating power Ph is computed based on the engine torque and the engine speed.

Figure 11:
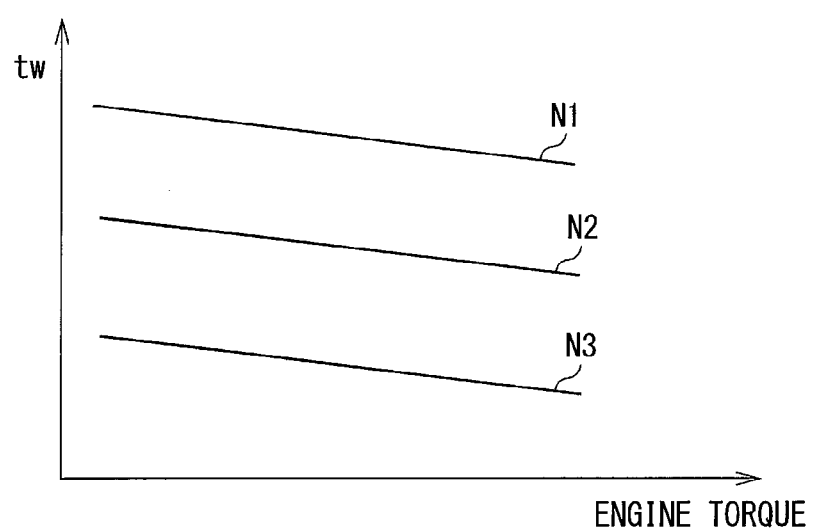
FIG. 11 is a graph showing a map determining a temperature measuring period according to the second embodiment.

The temperature measuring period tw is previously computed according to the equation (4). Further, a map indicating a relationship between the temperature measuring period tw, the engine torque, and the engine speed is established as shown in FIG. 11. As shown in FIG. 11, the engine speeds N1, N2, and N3 have relationships that N1 is less than N2 and N2 is less than N3, as the same as FIG. 9.

At 204, the hybrid control device 50 computes the temperature measuring period tw according to the map, based on the engine operation point including the engine torque and the engine speed which are determined at a previous operation. The engine operation point may be an average point of a predetermined number of times of the engine operation points. Alternatively, the temperature measuring period tw may be directly computed according to the equation (4). The temperature measuring period tw decreases in accordance with an increase in engine load.

Further, the hybrid control device 50 computes the measuring-period difference Δt between the SOC measuring period ts and the temperature measuring period tw, according to an equation (5).

$$\Delta t=|tw-ts| \qquad (5)$$

At 205, the hybrid control device 50 computes a correction heating quantity based on the measuring-period difference Δt. The correction heating quantity is used to make the coolant timing match the SOC timing.

When the temperature measuring period tw is greater than the SOC measuring period ts, a correction heating quantity H1 outputted by the heat pump system 30 is computed according to an equation (6) to make the coolant timing match the SOC timing.

$$H1=Ks \times (Bg-Bn)/\Delta t \qquad (6)$$

When the temperature measuring period tw is less than the SOC measuring period ts, a correction heating quantity H2 outputted by the exhaust heater 21 is computed according to an equation (7) to make the coolant timing match the SOC timing.

$$H2=Kw \times (Wg-Wn)/\Delta t \qquad (7)$$

At 206, the hybrid control device 50 determines the heating output and the engine operation point.

According to the present embodiment, the hybrid control device 50 determines the heating output based on the correction heating quantity H1 or the correction heating quantity H2. When the correction heating quantity H1 is greater than an upper limit of the output of the heat pump system 30, the electric heater output is set to the upper limit. When the correction heating quantity H1 is less than or equal to the upper limit, the electric heater output is set to the correction heating quantity H1. When the exhaust heater 21 is used as the heating device 20, the electric heater output is set as the same way as the above.

Further, the hybrid control device 50 determines the engine operation point which outputs the heating output. According to the present embodiment, when two or more engine operation points can output the heating output, the hybrid control device 50 selects the engine operation point having the highest engine efficiency.

Figure 12A:
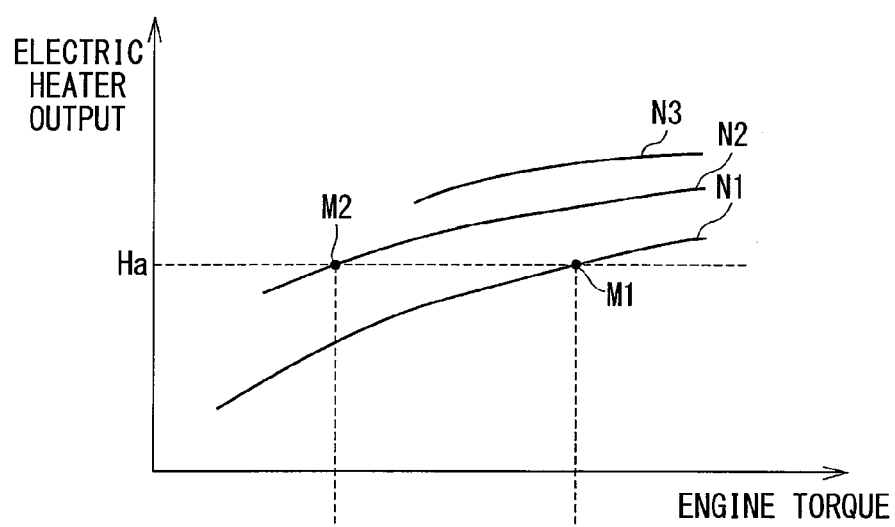
FIGS. 12A and 12B are graphs showing maps determining an engine operation point according to the second embodiment.
Figure 12B:
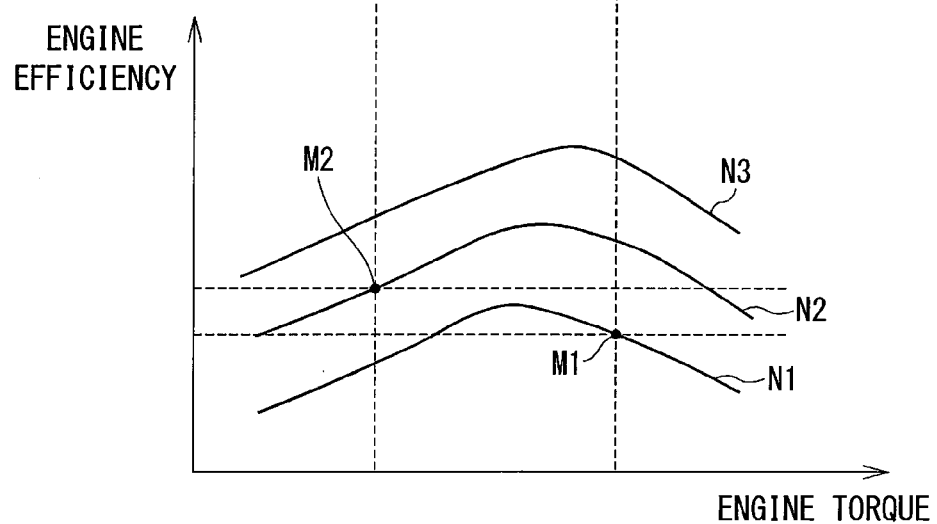

FIGS. 12A and 12B are graphs showing maps determining the engine operation point. As shown in FIGS. 12A and 12B, the correction heating quantity is outputted by the heat pump system 30.

As shown in FIG. 12A, a map indicating a relationship between the electric heater output, the engine torque, and the engine speed is established. When the electric heater output is referred to as Ha, two points M1 and M2 exist as the engine operation points corresponding to the electric heater output Ha. In this case, referring to FIG. 12B, the point M2 has an engine efficiency higher than that of the point M1. Therefore, according to the present embodiment, the hybrid control device 50 selects the point M2 as the engine operation point.

According to the present embodiment, when the air-conditioner request output Pa is greater than the correction heating quantity H1 or is greater than the correction heating quantity H2, one of the heat pump system 30 and the exhaust heater 21 that does not output the correction heating quantity outputs a shortage of the air-conditioner request output Pa. In this case, the shortage of the air-conditioner request output Pa is equal to a difference between the correction heating quantity H1 or H2 and the air-conditioner request output Pa. Specifically, when the correction heating quantity H1 is outputted by the heat pump system 30, the exhaust heater 21 outputs the shortage of the air-conditioner request output Pa. When the correction heating quantity H2 is outputted by the exhaust heater 21, the heat pump system 30 outputs the shortage of the air-conditioner request output Pa.

Operations in 207 to 212 correspond to operations in 105 to 110. At 210, the hybrid control device 50 changes an operation condition to continue the warming-up operation. Specifically, the hybrid control device 50 changes the operation condition to adjust the heating output and the engine operation point.

At 213, the hybrid control device 50 determines whether the warming-up is completed. When the hybrid control device 50 determines that the warming-up is not completed (213: No), the hybrid control device 50 returns to 202. When the hybrid control device 50 determines that the warming-up is completed (213: Yes), the hybrid control device 50 terminates the warming-up operation and executes the EV travelling.

According to the present embodiment, since the operations in 202 to 212 are repeated in the warming-up operation, the heating output and the engine operation point are corrected such that the SOC measuring period ts is equal to the temperature measuring period. Therefore, when the warming-up operation is completed, the SOC can reach the SOC target value Bg.

Figure 13A:
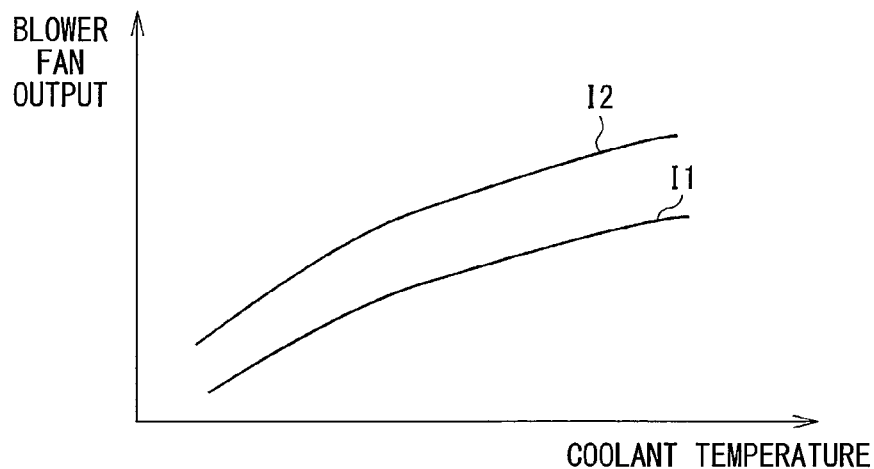
FIGS. 13A, 13B, and 13C are graphs showing maps determining an output of a blower fan according to the second embodiment.
Figure 13B:
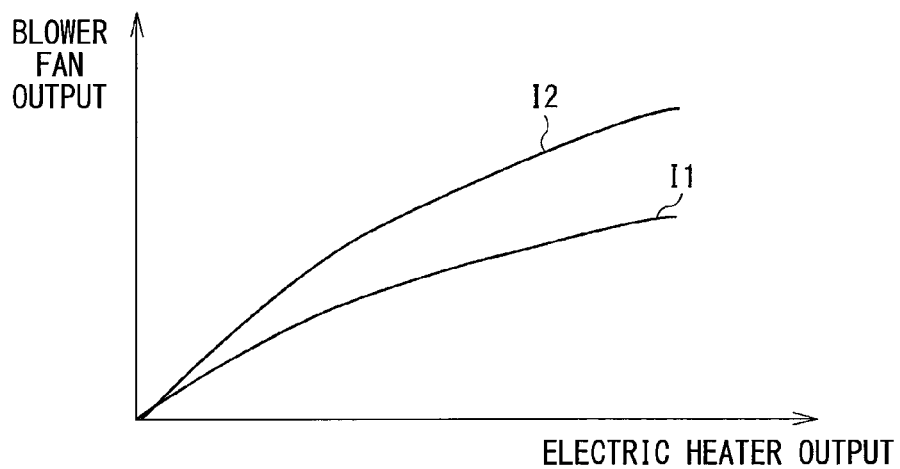
Figure 13C:
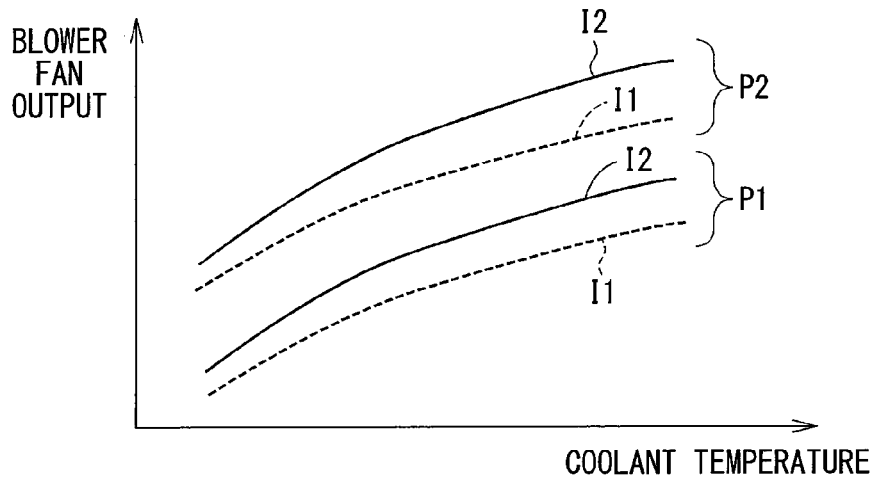

Referring to FIGS. 13A, 13B, and 13C, the output of the blower fan 40 will be described. When the warming-up is started in a case where the coolant temperature is low, or when the heat pump system 30 is used as the heating device 20 in a case where the output of the engine 10 is low, it is necessary to reduce the output of the blower fan 40 so as to prevent the cold air flowing toward passengers.

As shown in FIG. 13A, a map indicating a relationship between the output of the blower fan 40, the coolant temperature, and a temperature of an intake air is established. Further, I1 and I2 indicate the temperatures of the intake air as example, and I1 is less than I2. When the hybrid control device 50 uses the exhaust heater 21 as the heating device 20, the hybrid control device 50 determines the output of the blower fan 40 according to the map shown in FIG. 13A based on the coolant temperature and the temperature of the intake air.

As shown in FIG. 13B, a map indicating a relationship between the output of the blower fan 40, the electric heater output, and the temperature of the intake air is established. Further, I1 and I2 indicate the temperatures of the intake air as example, and I1 is less than I2. When the hybrid control device 50 uses the heat pump system 30 as the heating device 20, the hybrid control device 50 determines the output of the blower fan 40 according to the map shown in FIG. 13B based on the electric heater output and the temperature of the intake air.

As shown in FIG. 13C, a map indicating a relationship between the output of the blower fan 40, the coolant temperature, the electric heater output, and the temperature of the intake air is established. Further, I1 and I2 indicate the temperatures of the intake air as example, and I1 is less than I2. Furthermore, P1 and P2 indicate the electric heater outputs as example, and P1 is less than P2. When the hybrid control device 50 uses both the exhaust heater 21 and the heat pump system 30 as the heating device 20 in a case where the air-conditioner request output Pa is large, the hybrid control device 50 determines the output of the blower fan 40 according to the map shown in FIG. 13C based on the coolant temperature, the electric heater output, and the temperature of the intake air.

According to the present embodiment, when the warming-up is started in a case where the coolant temperature is low, or when the heat pump system 30 is used as the heating device 20 in a case where the output of the engine 10 is low, the output of the blower fan 40 is changed according to at least one of the coolant temperature and the electric heater output, so as to prevent the cold air flowing toward passengers. Since the outlet of the blower fan 40 can be warmed, the inner temperature can rapidly reach the target inner temperature in the heating after the warming-up even though the output of the blower fan 40 is low.

Further, the first embodiment has the same effect.

According to the present embodiment, the hybrid control device 50 specifies the high engine-efficiency area where the efficiency of the engine 10 is high, at 201. The hybrid control device 50 determines the engine operation point that can output the heating output computed based on the coolant temperature and the SOC, at 206.

Since the engine 10 can operate at the engine operation point with high efficiency without at the warming-up operation where the engine efficiency is inefficient due to a small load or no load, the fuel consumption of the engine 10 is improved.

When two or more engine operation points that can output the heating output determined based on the coolant temperature and the SOC exist, the hybrid control device 50 selects the engine operation point having the highest engine efficiency. Since the engine 10 can operate more efficiently, and the fuel consumption of the engine 10 is further improved.

According to the present embodiment, the hybrid control device 50 computes the correction heating quantities H1 and H2 based on the measuring-period difference Δt, and determines the heating output based on the correction heating quantity H1 or the correction heating quantity H2.

Therefore, the coolant timing can match the SOC timing.

Further, the first embodiment has the same effect.

According to the present embodiment, the hybrid control device 50 corresponds to the coolant-temperature acquiring portion, the power-residual acquiring portion, the heating start-timing determining portion, the heating-output determining portion, the blowing-output determining portion, a high engine-efficiency area determining portion, and an engine operation-point determining portion.

Figure 7:
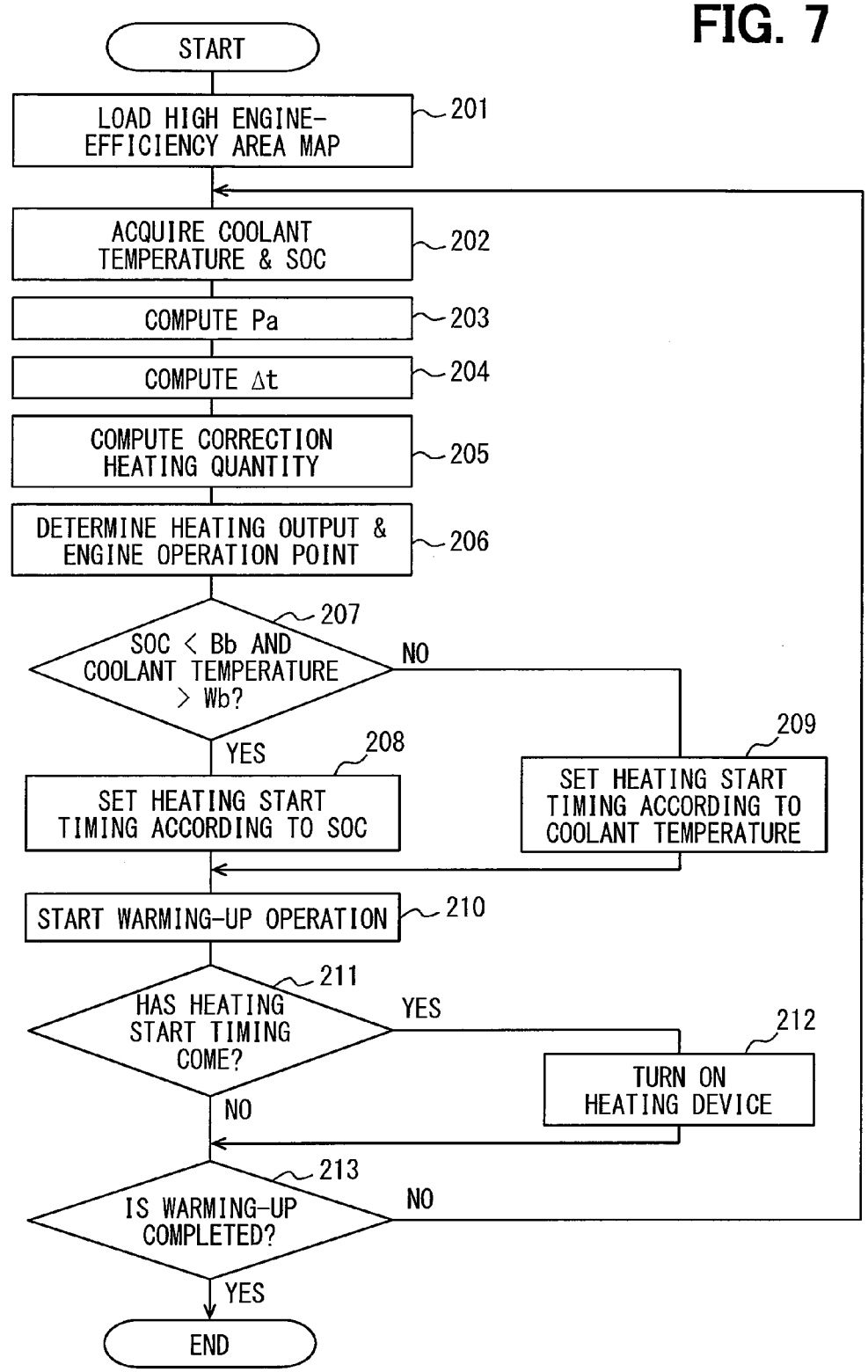
FIG. 7 is a flowchart showing the warming-up control according to a second embodiment of the present disclosure.

Further, as shown in FIG. 7, an operation in 202 corresponds to the coolant-temperature acquiring portion and the power-residual acquiring portion. Operations in 208 and 209 correspond to the heating start-timing determining portion. An operation in 206 corresponds to the heating-output determining portion and the engine operation-point determining portion. An operation in 201 corresponds to the high engine-efficiency area determining portion. An operation in 212 corresponds to the blowing-output determining portion.

Other Embodiment (a) According to the above embodiments, the electric heater includes the heat pump system. However, the electric heater may be any heater using an electric power of a power storage device. For example, the electric heater may be a positive temperature coefficient (PTC) heater. Further, according to the above embodiments, the electric heater is used to heat the interior of the vehicle. However, the electric heater may be used to heat a coolant.

(b) According to the second embodiment, the air-conditioner request output is computed. When the heating output is less than the air-conditioner request output, both the exhaust heater and the heat pump system are used. However, the heating output may be determined without considering the air-conditioner request output in the warming-up operation.

(c) According to the above embodiments, the hybrid control device, the power control device, the MG control device, the engine control device, and the air-conditioner control device are provided. However, the above control devices may be united as one control device. Further, according to the above embodiments, the hybrid control device corresponds to the coolant-temperature acquiring portion, the power-residual acquiring portion, the heating start-timing determining portion, the heating-output determining portion, the blowing-output determining portion, the high engine-efficiency area determining portion, and the engine operation-point determining portion. However, control devices other than the hybrid control device may correspond to a part of or all of the above portions. For example, the engine control device may correspond to the engine operation-point determining portion.

(d) According to the above embodiments, the hybrid vehicle has two motor generators. However, the hybrid vehicle may have more than two motor generators. Further, according to the above embodiments, each motor generator is a three-phase AC motor corresponding to a permanent-magnet synchronous motor. However, the motor generator is not limited, and may have other configurations.

Furthermore, according to the above embodiments, the power storage device is a rechargeable battery. However, the power storage device may be any devices which receive the electric power from or transmit the electric power to the motor generator and can be charged and discharged. For example, the power storage device may be an electric double layer capacitor.

The present disclosure is not limited to the embodiments mentioned above, and can be applied to various embodiments within the spirit and scope of the present disclosure.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle control device controlling a hybrid vehicle including an engine, a motor generator, a power storage device which receives an electric power from or transmits the electric power to the motor generator and can be charged and discharged, and a heating device which includes an exhaust heater using an exhaust heat of the engine and a heat pump system using the electric power of the power storage device, the vehicle control device comprising:
    a memory for storing executable instructions; and
    a processing system including a processor, the processing system upon execution of the instructions by the processing system being configured to:
        acquire a temperature of a coolant of the engine;
        acquire a power residual of the power storage device;
        determine a start timing of the heating device based on the temperature of the coolant and the power residual; and
        determine a heating output corresponding to an output of an electric heater and an output of the exhaust heater in a warming-up operation, based on the temperature of the coolant and the power residual, the heating output being determined such that a timing that the temperature of the coolant reaches a temperature target value matches a timing that the power residual reaches a power residual target value.

2. The vehicle control device according to claim 1, wherein:
    the processing system upon execution of the instructions is further configured to compute correction heating quantity based on a measuring-period difference, and determine the heating output based on the correction heating,
    the measuring-period difference is a difference between a temperature measuring period and a power residual measuring period,
    the temperature measuring period is a time that the temperature of the coolant reaches the coolant-temperature target value, and
    the power residual measuring period is a time that the power residual reaches the power residual target value.

3. The vehicle control device according to claim 1, wherein the processing system upon execution of the instruction is further configured to:
    specify a high engine-efficiency area where an efficiency of the engine is high; and
    determine an engine operation point that can output the heating output in the high engine-efficiency area.

4. The vehicle control device according to claim 3, wherein
    the engine operation point is selected as having the highest engine efficiency, when two or more engine operation points can output the heating output.

5. The vehicle control device according to claim 1, wherein the processing system upon execution of the instructions is further configured to:
    determine an output of a blower sending air toward an interior of the vehicle, based on at least one of the temperature of the coolant and the output of the electric heater.

* * * * *